UNITED STATES PATENT OFFICE.

KARL MANN, OF ZURICH, SWITZERLAND.

EMULSIONS AND PROCESS OF PRODUCING THEM.

No. 834,830.　　　　　　　Specification of Letters Patent.　　　　　Patented Oct. 30, 1906.

Application filed May 25, 1905. Serial No. 262,261.

*To all whom it may concern:*

Be it known that I, KARL MANN, doctor of philosophy, a subject of the German Emperor, residing at Zurich, Switzerland, have invented certain new and useful Improvements in Emulsions and the Process of Producing Them, of which the following is a specification.

This invention has reference to emulsions of bitumen and of asphalt mixtures and processes for preparing the same; and it is particularly intended to devise means for rendering asphalt and mixtures of asphalt with pitch, tar, wax, resins, earth wax, paraffin, petroleum, and with other substances which by themselves will not mix with water capable of mixing with water.

The manner of carrying the process into effect will be shown by way of the following example: About six pounds of soda-soap and four pounds crude starch are dissolved to a uniform mass by the addition of from twenty to forty pounds of water and by the use of heat, the starch being thereby converted into paste. Then there is added to the boiling mixture, preferably through a nozzle provided at the bottom of the mixing vessel, a solution of one hundred and eighty pounds of bitumen or the mixture of the same with the substances above mentioned dissolved in about four hundred to six hundred pounds of benzol, the solution being added gradually while the mass is constantly and most intimately mixed and agitated. The benzol becomes volatilized as soon as the solution of bitumen flows into the heated mass and is recovered by condensation, whereas the bitumen with the above-mentioned mixture remains intimately mixed and in such a state of fine subdivision that after cooling the mass while keeping it constantly stirred this intimate and fine subdivision will remain. Any water that might have been evaporated during this operation should be added again to the still hot mixture while keeping it vigorously stirred. By working in this manner a mass of ointment consistence is obtained which when stirred up or shaken with water will uniformly mix with the same and in such a manner as to produce a well-keeping emulsion.

The process may also be modified by first melting the materials—such as fatty acids, fats, resins, and the like—which are necessary for the formation of soap first with the bitumen or with the other substances to be emulsified and when cold dissolving the mixture in the solvents or by dissolving the materials along with the bitumen, &c., in a solvent, in which case the alkali required must be dissolved in the water necessary for the conversion of the starch into paste. The saponification will then take place gradually and in proportion as the solution of bitumen or of similar substances is mixed with the alkaline pasty mass.

The process hereinbefore described can be readily carried out in suitably-connected mixing and distilling apparatuses which are provided with means for effecting a continuous solution, the solvent being always recovered.

In a similar manner as bitumen, mixtures of bitumen with pitch, different kinds of tar of various extraction, or with paraffins, sulfur, fats, earth wax, crude petroleum, and with the residues from the purification of petroleum may be worked up and treated according to the process above outlined.

The emulsion obtained with sulfur are, for instance, admirably adapted as a substitute for the so-called "Bordeaux mixture" in the treatment of plants with sulfur.

For effecting the solution it is evident that for every kind of material the most suitable solvents—that is to say, such as will possess the greatest dissolving power at the lowest boiling-point—will have to be used. Such solvents are, for instance, chloroform, alcohol, several kinds of ethers, ether-alcohol, low-boiling hydrocarbons, volatile oils, carbon bisulfid, tetracarbon chlorid, and the like.

In place of crude starch it is also possible to use cereals directly and also potatoes and other vegetable and animal or inorganic colloidal substances of any suitable kind—such, for instance, as gums, pectin substances, vegetable mucilages, or colloidal oxids, silicates—and in place of the soap it is possible to use the aqueous solutions or emulsions prepared by the aid of alkalis, of the alkaline earths, of soluble glass, or borax from fats, resins, lacquers, oils, waxes, balsams, paraffins, as well as solutions of saponin or the like.

To the bitumen employed for one or the other purpose corresponding additions for the purpose of modifying its properties may be made—such as resins, oils, fats, and the like, as well as any inorganic or organic filling material.

Both the paste when diluted with water according to the intended usage, as well as the paste in an undiluted condition, may be used for various purposes, and in particular for all purposes where bitumen has been used heretofore in dissolved, powdered, or fused condition—thus, for instance, for impregnating fabrics, papers, and cardboards, and the like, for the coating of wooden articles and of masonry of any kind, besides for making fuel-bricks and ore-bricks, and especially for the purpose of preventing the formation of dust in road traffic and the like.

What I claim, and desire to secure by Letters Patent of the United States, is—

1. The process of producing emulsions which consists in dissolving an emulsifiable substance in a volatile solvent and in mixing the obtained solution with a mixture of soap and a colloidal substance.

2. The process of producing emulsions which consists in dissolving an emulsifiable substance in a volatile solvent, in mixing the obtained solution with a heated mixture of soap and colloidal substance and in collecting the vapors of the volatile solvent.

3. The process of producing emulsions which consists in dissolving bitumen in a volatile solvent and in mixing the obtained solution with a mixture of soap and a colloidal substance.

4. The process of producing emulsions which consists in dissolving mixtures of bitumen and of an emulsifiable substance in a volatile solvent and in mixing the obtained solution with a mixture of soap and colloidal substance.

5. The process of producing emulsions which consists in melting bitumen with another emulsifiable substance, in dissolving the mixture cooled down in a volatile solvent and in mixing the obtained solution with a mixture of soap and a colloidal substance.

6. The process of producing emulsions which consists in dissolving an emulsifiable substance in a volatile solvent and in mixing the obtained solution with a mixture of soap and starch paste.

7. The process of producing emulsions which consists in dissolving an emulsifiable substance in a volatile solvent and in mixing the obtained solution with a heated mixture of soap and starch paste and in collecting the vapors of the volatile solvent.

8. The process of producing emulsions which consists in dissolving an emulsifiable substance in a suitable volatile solvent, in adding to the solution substances saponifiable by alkalis and in pouring the mass in a heated mixture of colloid substance and alkali.

9. The process of producing emulsions which consists in dissolving an emulsifiable substance in a suitable volatile solvent, in adding to the solution substances saponifiable by alkalis, in pouring the mass into a heated mixture of colloid substance and alkali and in collecting the vapors of the volatile solvent.

10. The process of producing emulsions which consists in dissolving an emulsifiable substance in a volatile solvent, in adding to the solution an alkaline substance, in pouring the mass into a heated mixture of colloid substances and of substances saponifiable by the alkali and in collecting the vapors of the volatile solvent.

In testimony whereof I have hereunto set my hand in presence of two subscribing witnesses.

KARL MANN.

Witnesses:
   Eug. Braschler,
   A. Lieberknecht.